(12) United States Patent
Pope et al.

(10) Patent No.: US 7,628,847 B2
(45) Date of Patent: Dec. 8, 2009

(54) DEVICE FOR REMOVING PARTICULATE, VARIOUS ACIDS, AND OTHER CONTAMINANTS FROM INDUSTRIAL GASES

(75) Inventors: G. Michael Pope, Cape Coral, FL (US); Jerry Green, Anchorage, AK (US)

(73) Assignee: Artec 1, Inc., Buffalo Grove, IL (US)

( * ) Notice: Subject to any disclaimer, the term of this patent is extended or adjusted under 35 U.S.C. 154(b) by 361 days.

(21) Appl. No.: 10/578,541

(22) PCT Filed: Nov. 8, 2004

(86) PCT No.: PCT/US2004/037257

§ 371 (c)(1),
(2), (4) Date: Mar. 8, 2007

(87) PCT Pub. No.: WO2005/046842

PCT Pub. Date: May 26, 2005

(65) Prior Publication Data

US 2007/0251393 A1    Nov. 1, 2007

Related U.S. Application Data

(60) Provisional application No. 60/518,076, filed on Nov. 7, 2003.

(51) Int. Cl.
  B01D 53/14 (2006.01)
  B01D 47/12 (2006.01)
(52) U.S. Cl. .............................. 96/242; 96/290; 96/352; 96/416; 261/115
(58) Field of Classification Search .................. 96/290, 96/329, 351, 352, 416, 242; 261/115, 121.1, 261/126; 95/228
See application file for complete search history.

(56) References Cited

U.S. PATENT DOCUMENTS

| 2,070,578 | A | 2/1937 | Bowman |
| 3,465,504 | A | 9/1969 | Oropeza et al. |
| 3,957,464 | A | 5/1976 | Teller |
| 4,247,532 | A | 1/1981 | Saletan et al. |
| 4,661,130 | A | 4/1987 | Ebling et al. |
| 2002/0110511 | A1 | 8/2002 | Klingspor et al. |

OTHER PUBLICATIONS

International Search Report PCT/US04/37257 Dated Apr. 6, 2005.

*Primary Examiner*—Frank M Lawrence
(74) *Attorney, Agent, or Firm*—Clausen Miller PC

(57) ABSTRACT

Exhaust gases enter the tank of a columnar vessel (12) and are subsequently forced through a diffuser (24) that is at least partially immersed in a column of solution.

8 Claims, 2 Drawing Sheets

US 7,628,847 B2

Figure 1:
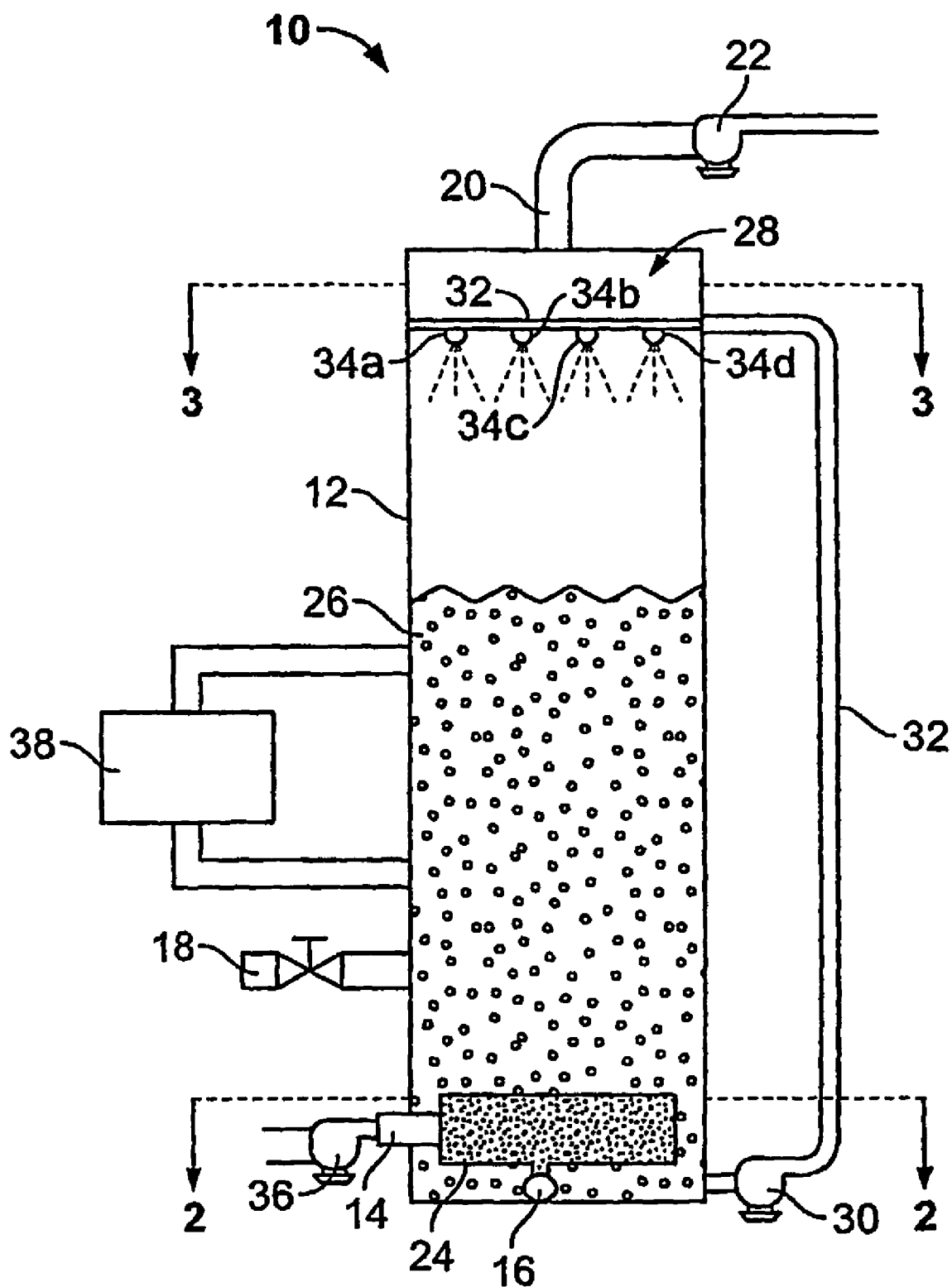

DEVICE FOR REMOVING PARTICULATE, VARIOUS ACIDS, AND OTHER CONTAMINANTS FROM INDUSTRIAL GASES

RELATED APPLICATIONS

This application claims the benefit of U.S. Provisional Application No. 60/518,076, filed Nov. 7, 2003, which is incorporated herein by reference in its entirety.

BACKGROUND OF THE INVENTION

Industrial air emissions are often cited as a source of various environmental problems, such as ozone layer depletion, global warming, and acid rain, not to mention health related issues for those individuals working or residing in affected areas. For example, incineration of organic materials often results in the formation of carbon dioxide and nitrous oxides, which are implicated with, among other things, the formation of volatile organic compounds that contribute to smog problems in urban areas. Such pollution is known to lead to various health related issues, such as pulmonary disease and increased cancer risks, as well as having negative effects on surrounding vegetation. As public sentiment and governments continue to pursue enactment of stricter emission requirements, industry struggles to find economically feasible solutions.

The Environmental Protection Agency ("EPA") monitors the emission of numerous types of particulates and contaminants, including $SO_2$, HCL, heavy metals, and nitrous oxides. Such pollutants may be present in low velocity exhaust from the operation of various types of industrial equipment and processes, hereinafter referred to as production source, such as internal combustion engines, boilers, incinerators, pyrolysis systems, and waste gasifiers. Yet, changes in processes and the capital investment required to purchase and operate purification systems in order to meet continually stricter emission requirements can be costly, especially given the complexity of most air cleaning systems such as bag houses, wet scrubbers, and electrostatic precipitators.

One type of existing purification system is known as a wet scrubber. Conventional wet scrubbers are reasonably complicated fabrications that typically require high pressure pumps and blowers to mix a mist of solution with incoming exhaust gases as said exhaust gases flow through the system's process ducting. The mist may be comprised of a water solution that may also include lime or other solutions. Water sprayed into scrubber systems are often collected in a tank for disposal. It is not uncommon for conventional scrubbers to use in excess of 250 gallons of water per hour of operation (or 6,000 gallons per day). Therefore, convention wet scrubbers may not only be expensive to install, but also expensive to operate.

It is therefore an object of the present invention to provide a relatively inexpensive and simple to operate system that reduces or eliminates the presence of many airborne pollutants in production source exhaust gases.

It is another object of the present invention to provide an apparatus that may improve the solubility of carbon dioxide.

It is another object of the present invention to provide an apparatus that reduces or removes harmful pollutants from production source exhaust gases that may also reduce the size and cost of downstream exhaust piping and exhaust gas management equipment.

At least one of the preceding objects is met, in whole or in part, by the present invention, which will become apparent in view of the present specification, including the claims and drawings.

BRIEF SUMMARY OF THE INVENTION

The present invention pertains to a device for removing particulates, acids, heavy metals, and other contaminants from production sources such as internal combustion engines, boilers, incinerators, pyrolysis systems or waste gasifiers, dryers, paint booths, or other such sources of air pollution. For example, the present invention may assist in reducing the emission of nitrous oxides from waste gasification systems, such as that described in U.S. Patent Publication Nos. US 2004/00314124 A1 and US 2005/0115478 A1, both of which are incorporated herein by reference in their entirety. The invention is especially useful for cleaning exhaust gases that require compliance with EPA criteria limits for particulate (dust), $SO_2$, and HCl (acid) emissions. More particularly, the present invention relates a columnar vessel apparatus in which exhaust gases are bubbled through either a fresh water or a brine/calcium carbonage/caustic soda or other neutralizing agent(s) solution, (hereinafter referred to as "the solution"), to remove contaminants that are entrained within the exhaust gases, and which may also cool the temperature of the exhaust gases, thereby reducing the final exhaust gas volume.

The columnar vessel includes a tank, inlet port, exhaust port, diffuser, solution, and mist assembly. The tank may include a solution fill inlet and a hatch. The hatch, which may be located in proximity to the lower end of the tank, may be operably configured to permit at least a portion of the solution to be drained from the tank. The tank may also include a removable access panel or site glass that may provide an access point for maintenance or observing the operation of the columnar vessel. Further, the tank may provide an access and egress port through which the solution may be fed from the tank, through a cooling unit, and returned at a lower temperature to the tank, thus maintaining a desired temperature for the column of solution.

Production source exhaust gases are drawn into the tank through the use of an inlet fan. Upon entering into the tank, the exhaust gases are forced through a diffuser, the diffuser being at least partially immersed in solution. In the illustrated embodiment of the present invention, the diffuser may be fully immersed in the solution. As the exhaust gases pass through the diffuser and enter into column of solution, the diffuser breaks the exhaust gases down into micro-fine gas bubbles. By reducing the size of the exhaust gas bubbles, the surface area of the exhaust gas that is exposed to the solution may be significantly increased. Further, decreasing the size of the exhaust gas bubbles may improve the reactivity of the exhaust gas with the surrounding solution by slowing the movement of the micro-fine bubbles toward the surface of the column of solution, thereby increasing retention time and exposure of the contaminant-laden gases to the surrounding solution.

The composition of the solution may be determined by the contaminants that are to be removed from the subject exhaust gas. For instance, fresh water may be sufficient for many dust or particulate control applications. In such cases, the dust or particulate particle would simply become water wet and be entrapped in the solution. Periodically, the columnar vessel may then be taken off line, providing time for the dust or particulates to settle to the bottom of the tank for eventual removal.

The presence of brine, for example simulated sea water, in the solution may also increase the uptake of carbon dioxide and provide absorption through chemical reactions with other contaminants in the exhaust gas. Further, by utilizing a cooling unit to control the temperature of the solution in the tank, the solubility of carbon dioxide may be increased. Similarly, controlling the salinity of the solution may also allow for improved carbon dioxide solubility. A solution comprised of fresh water and caustic soda or other neutralizing agents, such as lime, may also effectively extract and neutralize significant amounts of HCl, $SO_2$, or other acids entrained in the exhaust gas. HCL and $SO_2$ are both very soluble in water, and the presence of a suitable alkali will neutralize them, minimizing the formation of an acidic solution. Calcium Hydroxide ($Ca(OH)_2$), Calcium Carbonate ($CaCO_3$), and/or Sodium Bicarbonate ($NaHCO_3$), if desired, can also be mixed with the solution to assist in the absorption of other acids found in various types of production source exhaust gases. Aeration balls (Bio-pins) of varying diameters may also be suspended in the solution, the presence of aeration balls in the solution possibly increasing retention time as well as the turbulence of the exhaust gas and solution mix, thereby improving the potential for chemical reactions.

By providing cooling of the solution through the use of a cooling unit, the warm exhaust gas entering the column reduces in volume as per natural gas laws (the cooler a gas, the smaller its volume). The effect of cooling the incoming exhaust to a level below its dew point has the effect of causing heavy metals to drop out of its airborne suspension and may allow for the collection of such heavy metals in the solution. The amount of cooling is adjustable depending on the composition and nature of the contaminants in the exhaust gas being cleaned.

Once the exhaust gases rise from the surface of the column of solution, the gases may be sprayed by a mist of solution that is delivered by a mist assembly. The mist assembly may pump solution from the column of solution through at least one nozzle. The mist of solution provides an additional opportunity to remove or reduce the level of contaminants in the exhaust gas. The exhaust gases may then reach the exhaust port, whereupon an exhaust fan may divert the exhaust gases for further processing or appropriate discharge into the atmosphere.

By increasing retention time, enhancing the gases' surface area in the solution, and increasing turbulence of the exhaust gases-solution mix, while controlling the temperature and salinity of the solution, the present invention may be more efficient than wet scrubbers or electrostatic precipitators in removing particulates, acids, and other chemical contaminants. Further, the exposure of the exhaust gas to the solution will also aid in reducing the temperature of the exhaust gas, thereby reducing the final gas volume. A smaller volume of exhaust gas passing through the exhaust port of the columnar vessel may allow for smaller and more economical down stream piping and air handling equipment, thereby reducing the associated equipment, fabrication, and maintenance costs of such downstream equipment.

The system of the present invention may be significantly less expensive to construct and operate than conventional wet scrubbers due to its simplicity of design, ease of construction, and low operating costs. The columnar vessel of the present invention may require approximately half the component parts of a conventional wet scrubber. Further, power requirements for percolating exhaust gas through the columnar vessel of the present invention may be far less than what is required for atomizing chemical mixtures in a wet scrubber system, given the lower electric demand for the lower pressure fan/compressor and other components. Additionally, the present invention may allow for a major reduction in daily water consumption. The present invention may use a static column of 750 to 1500 gallons of water, depending on the materials to be removed from the exhaust gas and the gas flow volume. Tests indicate that this volume of brine solution will continue to absorb or precipitate out contaminants for up to 15 days before the solution needs to be cleaned or replaced. In comparison with wet scrubber systems, the present invention may provide a daily water savings of approximately 5,900 gallons or a 98% reduction. The system is particularly advantageous for use with production sources that are already relatively clean, and require only modest to occasional reduction in criteria pollutants to meet EPA requirements.

BRIEF DESCRIPTION OF SEVERAL VIEWS OF THE DRAWINGS

FIG. 1 illustrates a side cross sectional elevation view of a columnar vessel configured to reduce or remove the presence of contaminants in production source exhaust gases in accordance with the illustrated embodiment of the present invention.

FIG. 2 illustrates a cross sectional view of the lower end of the tank of the columnar vessel in accordance with the illustrated embodiment of the present invention.

FIG. 3 illustrates a cross sectional view of the upper end of the tank of the columnar vessel in accordance with the illustrated embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a side elevation view of a columnar vessel 10 configured to reduce or remove the presence of contaminants in production source exhaust gases in accordance with the illustrated embodiment of the present invention. The columnar vessel 10 includes a tank 12, an inlet port 14, an exhaust port 20, a diffuser 24, solution 26, and a mist assembly 28. The number and the size of columnar vessels 10 required may be determined by the particular needs of the associated production source(s).

The tank 12 includes an interior portion, a lower end, and an upper end. As shown in FIG. 1, the tank 12 may be vertical and may be constructed from a variety of materials, including metallic materials or materials that offer some resistance to acidic or caustic corrosion, such as fiberglass or plastic. The tank 12 may be sized to accommodate the throughput of exhaust gas from the production source at a flow rate which provides adequate retention time of the exhaust gas in the solution 26. The sizing criteria for the tank 12 may be based on a variety of factors, including the type of production source involved, the flow rate of exhaust gases into the column vessel 10, the particulate (entrained solids) load, and the specific chemical contaminants to be removed. For example, a tank 12 having a three (3) foot diameter and a height of ten (10) feet may accommodate small gas exhaust streams from 1,000 to 3,000 cubic feet per minute (cfm). Larger volume exhaust streams may require one or more columns of ten (10) feet in diameter and sixty (60) feet in height.

The lower end of the tank 12 may include a clean-out hatch 16 that is configured for draining at least a portion of the solution 26 and any recovered particulate matter out of the interior portion of the tank 12. Alternatively, the hatch 16 may also be configured to provide a source of access to at least a portion of the inner portion of the tank 12. Such access may also provide a point of entry for tank 12 maintenance, such as changing of the diffuser 24. Additionally, the tank 12 may further include an inspection port that may provide a point of access for maintenance or observation of the operation of the columnar vessel 10, for example a removable access panel or a site glass. In the illustrated embodiment of the present invention, the inspection port may be located six (6) feet above ground level on the side of the tank 12.

Exhaust gases from the production source may enter the lower end of the tank 12 through an inlet port 14. The inlet port 14 may be operably connected to an inlet fan 36 which may assist in propelling the exhaust gases into a diffuser 24 within the tank 12. Alternatively, exhaust gases from the production source may be propelled into the diffuser 24 with sufficient force by a compressor, venturi, eductor, or aspirator. A check valve may also be used with inlet port 14 to ensure that there is no backflow from the tank 12.

Figure 2:
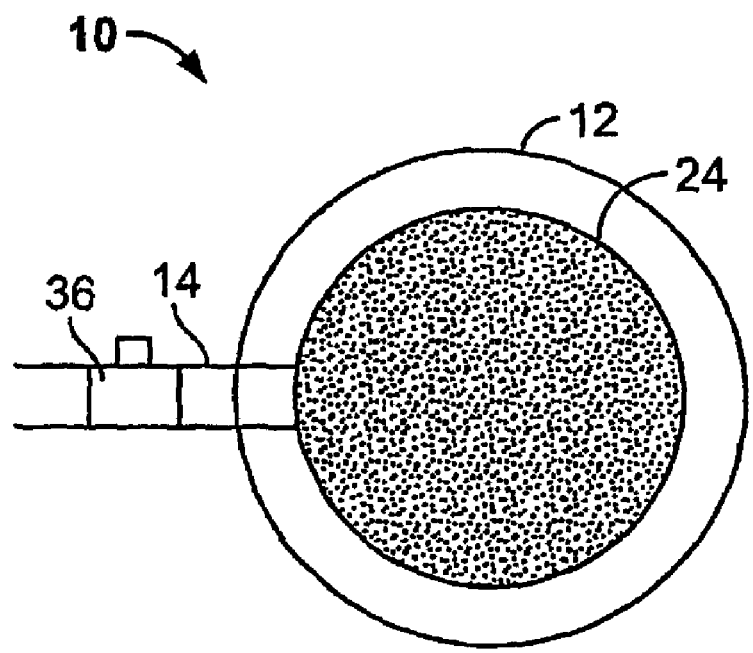

FIG. 2 illustrates a cross sectional view of the lower end of the tank 12 of the columnar vessel 10 in accordance with the illustrated embodiment of the present invention. As shown, exhaust gases from the production source entering into the tank 12 are forced through the diffuser 24. The diffuser 24 may be located in the lower end of the tank 12 and is at least partially immersed within the solution 26. The diffuser 24 may located at the base of the tank 12 or may be suspended above the base and hatch 16 so as to minimize or eliminate interference with the drainage of solution through the hatch 16. In the illustrated embodiment of the present invention, the diffuser 24 may be an aeration stone that may be made of alumina, wood or silica. The diffuser 24 may break incoming exhaust gases down into micro-fine bubbles within the solution 26, which increases the surface area of the exhaust gases, thus improving exposure of the exhaust gases to the solution 26 in the tank 12. In the illustrated embodiment, the diffuser 24 optimally breaks the incoming exhaust gas into bubbles of approximately 0.5 to 1.0 mm in diameter. By decreasing the size of the exhaust gas bubbles passing through the solution 26, the surface tension of the exhaust gas bubbles may also be decreased, thereby improving the reactivity of the gas with the surrounding solution 26.

The selection of solution 26 may be based on the content of the exhaust gas. For instance, a solution 26 containing brine, such as fresh water, may be sufficient for many dust or particulate control applications. The presence of brine in the solution 26 may also allow for the uptake of carbon dioxide and may provide absorption through chemical reaction with other contaminants in the exhaust gas. In such an embodiment, for optimum effect, the specific gravity of the brine solution may be approximately 1.015 to 1.025, as measured by hydrometer, with a pH level of approximately 8.0 to 8.5. Alternatively, a solution 26 comprised of a brine solution and caustic soda or other neutralizing agents, such as lime, may effectively extract significant amounts of HCl, $SO_2$, or other acids entrained in the exhaust gas. Calcium Hydroxide ($Ca(OH)_2$), Calcium Carbonate ($CaCO_3$), and/or Sodium Bicarbonate ($NaHCO_3$) can also be mixed with the solution 26 to assist in the absorption of other acids found in various types of production source exhaust gases.

In another embodiment, the solution 26 may include aeration balls (Bio-pins) of varying diameters that are suspended in a brine solution. The quantity and size of the aeration balls may depend on several factors, such as the desired retention/transit time desired for the exhaust gas flowing through the solution 26. The aeration balls, which may be plastic, may slow the rate of the gas bubbles rising to the surface of the column of solution 26, thereby increasing retention time, as well facilitate turbulence in the exhaust gas and solution 26 mix, thereby improving the potential for chemical reactions.

Solution 26, or at least a component of the solution 26, may enter the tank 12 through a water fill inlet 18, as illustrated in FIG. 1. In the illustrated embodiment, the water fill inlet 18 may be positioned approximately twenty four (24) inches below the top of the tank 12. The tank 12 should be sized to contain a sufficient quantity of solution 26 so as to allow for sufficient retention time of the exhaust gases rising through the column of solution 26. The taller the column of solution 26, the longer the time required for the bubbles to rise to the surface, thereby increasing the reaction time for the gases to interact with the solution 26. For example, in the illustrated embodiment, a three (3) foot diameter, ten (10) foot high tank 12 and the column of solution 26 contained therein may be of sufficient volume and height to retain exhaust gases within the solution 26 for approximately 4 to 10 seconds. Additionally, the tank 12 may be filled to 70% of its total height with a combination of solution 26 and two (2) inch diameter aeration balls.

A cooling unit 38 may be operably connected to the tank 12 so as to allow access and egress ports through which the solution 26 may be fed from the tank 12, through the cooling unit 38, and returned to the tank 12 at a lower temperature, thereby maintaining a desired temperature of the column of solution 26. The temperature of the column of solution 26 may be cooled so that the solution 26 does not reach its boiling point. Further, the cooling unit 12 may also reduce the temperature of the solution 26 so as to improve the solubility of carbon dioxide.

Figure 3:
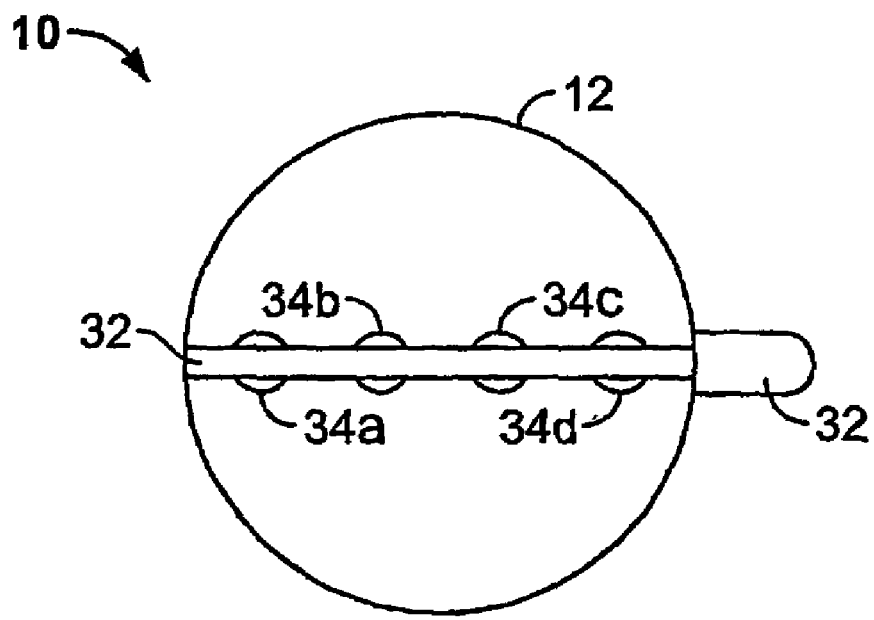

As illustrated in FIGS. 1 and 3, the columnar vessel 10 also includes a mist assembly 28 that applies a fine mist spray of solution 26 to exhaust gases as the exhaust gas bubbles rise from the upper surface of the column of solution 26. In the illustrated embodiment of the present invention, the mist assembly 28 includes at least one nozzle 34a, 34b, 34c, 34d, piping 32, and a solution pump 30. In the illustrated embodiment, solution 26 within the tank 12 is pumped through the piping 32 of the mist assembly 28 by the solution pump 30, which may be similar to a water pump. Alternatively, the liquid substrate forced through the nozzles 34a, 34b, 34c, 34d may be delivered from an ancillary source of solution 26, such as a separate tank or container. The solution 26 is then injected through at least one spray nozzle 34a, 34b, 34c, 34d. The mist of solution 26 may provide an additional opportunity to expose the exhaust gases rising from the bursting bubbles in the tank 12 to the solution 28. This additional exposure may allow for further chemical reactions between exhaust gases and the solution 28 prior to the release of the exhaust gases from the columnar vessel 10. The solution 26 sprayed from the nozzles 34a, 34b, 34c, 34d, subsequently returns to the column of solution 26, thereby recycling the solution 26.

Once the exhaust gas reaches the top of the tank 12, an exhaust fan 22, such as an induced draft fan, eductor, aspirator, or compressor, withdraws or vents the treated and cooled gases out the exhaust port 20, the exhaust port 20 being located in proximity to the upper end of the tank 12. The gases are then diverted for further processing or appropriate discharge to the atmosphere.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A columnar vessel pollution control device for removing solid particulates, acids, heavy metals, contaminate gases or other contaminates from industrial exhaust gases in two stages, the first stage being a liquid solution stage and the second stage being a mist spray stage, the device comprising:
   a. a tank having an interior portion, a lower end, an upper end, an inlet port, and a outlet port, said inlet port configured to receive an exhaust gas from a production source;
   b. a liquid solution, said liquid solution contained within said interior portion of said tank to form a column up to about 70% the height of the tank, wherein said tank and said solution are configured to retain at least a portion of said plurality of small gas bubbles passing through said column of solution for approximately 4 to 10 seconds, said liquid solution having a composition selected to remove the contaminants from said exhaust gas;
   c. a diffuser located within the lower end of said interior portion of said tank, said diffuser positioned to receive said plurality of exhaust gas from said inlet port, said diffuser comprising an aeration stone immersed in said liquid solution, said aeration stone configured to break down said exhaust gas into a plurality of small gas bubbles having an average diameter of less than about 1.0 mm; and
   d. a mist assembly operably connected to said interior portion of said tank; said mist assembly including at least one nozzle, said at least one nozzle configured to spray said plurality of exhaust gas with a mist of said liquid solution within said interior portion as said small gas bubbles rise from said column of said solution.

2. The invention of claim 1 wherein said tank further includes a hatch in proximity to the lower end of said tank, said hatch configured to allow at least a portion of said column of solution to drain from said interior portion of said tank.

3. The invention of claim 1 wherein said tank further includes an inspection port, said inspection port configured to provide a point of access for maintenance or observation of said interior of said tank.

4. The invention of claim 1 wherein said solution is comprised of a brine solution.

5. The invention of claim 1 wherein said solution is comprised of a brine solution and caustic soda.

6. The invention of claim 1 wherein said solution includes Calcium Hydroxides Calcium Carbonate, or Sodium Bicarbonate.

7. The invention of claim 1 wherein said solution includes a plurality of aeration balls suspended within said solution.

8. The invention of claim 1 further including a cooling unit, said cooling unit configured to cool at least a portion of said column of solution, said cooling unit operably connected to said tank to allow at least a portion of said column of solution to flow out from said tank, through said cooling unit, and back into said tank.

* * * * *